US008345638B2

(12) United States Patent
Buchmayer et al.

(10) Patent No.: US 8,345,638 B2
(45) Date of Patent: Jan. 1, 2013

(54) METHOD OF MAINTAINING BROADCAST SERVICE CONTINUITY

(75) Inventors: Mats Buchmayer, Stockholm (SE); Henrik Enbuske, Stockholm (SE); Gunnar Mildh, Sollentuna (SE); Kai-Erik Sunell, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 315 days.

(21) Appl. No.: 12/602,409

(22) PCT Filed: Jan. 28, 2008

(86) PCT No.: PCT/SE2008/050101
§ 371 (c)(1),
(2), (4) Date: Nov. 30, 2009

(87) PCT Pub. No.: WO2008/153474
PCT Pub. Date: Dec. 18, 2008

(65) Prior Publication Data
US 2010/0195622 A1    Aug. 5, 2010

(30) Foreign Application Priority Data
Jun. 14, 2007   (SE) ...................................... 0701452

(51) Int. Cl.
*H04W 4/02*   (2009.01)
(52) U.S. Cl. ...................................... 370/332; 455/436
(58) Field of Classification Search .................. 370/331, 370/332, 252, 342, 486; 455/436, 437
See application file for complete search history.

(56) References Cited

U.S. PATENT DOCUMENTS

| 8,064,444 | B2 * | 11/2011 | Connors et al. | 370/390 |
|---|---|---|---|---|
| 2003/0099207 | A1 * | 5/2003 | Yamato | 370/280 |
| 2004/0224691 | A1 * | 11/2004 | Hadad | 455/442 |
| 2005/0277415 | A1 * | 12/2005 | Hamalainen et al. | 455/436 |
| 2006/0205406 | A1 * | 9/2006 | Pekonen et al. | 455/436 |
| 2007/0133497 | A1 * | 6/2007 | Vare et al. | 370/345 |
| 2007/0237094 | A1 * | 10/2007 | Bi et al. | 370/254 |
| 2009/0252070 | A1 * | 10/2009 | Connors et al. | 370/311 |

FOREIGN PATENT DOCUMENTS
WO    2005048529 A1    5/2005

OTHER PUBLICATIONS
International Search Report for PCT/SE2008/050101 mailed Nov. 7, 2008.

(Continued)

*Primary Examiner* — Brian D Nguyen
(74) *Attorney, Agent, or Firm* — Potomac Patent Group PLLC

(57) ABSTRACT

An access node in the boundary area of a single frequency network service area transmits a boundary indication to the mobile terminals in the boundary area to notify the mobile terminals that they are approaching the boundaries of the single frequency network. The mobile terminals receiving the boundary indications may then take steps to maintain continuity of broadcast services when the mobile terminals leave the service area of the single frequency network.

12 Claims, 7 Drawing Sheets

OTHER PUBLICATIONS

3GPP, "MBMS Service Continuity When Moving Between SFN and Non-SFN Zones," 3GPP TSG-RAN WG3, #55bis, R3-070561, Malta, Mar. 27-30, 2007, pp. 1-6.

3GPP, "Test Proposal for MBMS Service Continuity When Moving Between SFN and Non-SFN Zones," 3GPP TSG-RAN WG3, #55bis, R3-070712, Malta, Mar. 27-30, 2007, pp. 1-4.

3GPP, Technical Specification, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)," 3GPP TS 36.300 V8.0.0, Mar. 2007, pp. 1-82.

* cited by examiner

METHOD OF MAINTAINING BROADCAST SERVICE CONTINUITY

TECHNICAL FIELD

The present invention relates generally to broadcast and multicast services in mobile communication networks and, more particularly, to a method of maintaining continuity of a broadcast service when a mobile terminal leaves a single frequency network service area.

BACKGROUND

The 3$^{rd}$ Generation Partnership Project (3GPP) includes a work item known as Long term Evolution (LTE) to improve the Universal Mobile Telecommunications System (UMTS) standard in response to increased demand for mobile data services. Multimedia Broadcast and Multicast service (MBMS) is one service offered in the UMTS standard. MBMS is a broadcast service similar to conventional television and radio broadcast systems in which the same content is transmitted to multiple users located in a specific service area, referred to herein as the broadcast service area. Mobile TV, a service that enables mobile terminals to receive ordinary television programs, is one example of a MBMS.

Two different scenarios are contemplated for providing MBMS: single cell transmission and MBMS Single Frequency Network (MBSFN). With single cell transmission, the broadcast content is transmitted to the user from a single cell and a user may be handed over as it moves from one cell to another. In MBSFN, multiple transmitters in different cells transmit the same broadcast service synchronously using the same radio resources. There is no need for the network to handover the user as the user moves between cells within the MBSFN service area. Outside the MBSFN service area, the mobile terminal receives the broadcast service from a single cell.

In general, MBSFN may be preferable in service areas where there are many users. MBSFN provides an efficient way of providing services to a large user population that is dispersed over a wide area. On the other hand, single cell transmission may be preferred in service areas where there are a small number of users or the user density is low. Consequently, a broadcast service area may include both MBSFN service areas and non-MBSFN cells.

When a mobile terminal is operating within an MBSFN service area, the mobility of the mobile terminal will typically not be an issue because the broadcast service will be provided by all cells within the MBSFN service area. There is no need for the network to track the mobility of the mobile terminal in order to provide the broadcast service. However, when the mobile terminal moves from an MBSFN service area to a non-MBSFN cell, the broadcast service may be interrupted or lost unless the mobile terminal can receive the broadcast service in the non-MBSFN cell. If the mobile terminal is operating in a receive-only mode, the network may not know the exact location of the mobile terminal and thus may not be aware when the mobile terminal is approaching a boundary of the MBSFN service area. Therefore, some mechanism is needed in order to maintain continuity of broadcast services as the mobile terminal moves between an MBSFN service area and a non-MBSFN cell.

SUMMARY

The present invention provides a method and apparatus for indicating to a mobile terminal when it is approaching a boundary of an MBSFN service area. According to one exemplary embodiment, border cells in an MBSFN service area transmit an explicit or implicit boundary indication to mobile terminals in the boundary region of the MBSFN service area. When a mobile station receives the boundary indication, it may perform a service continuity action in order to maintain continuity of the broadcast service as the mobile terminal moves from the MBSFN service area to a single cell transmission in a non-MBSFN cell. In one exemplary embodiment, the boundary indication comprises an explicit boundary indicator transmitted on a broadcast control channel in the boarder cells of the MBSFN service area. In another exemplary embodiment, the formatting of type of information transmitted on the broadcast control channel in the border cells serves as an implicit indication.

DETAILED DESCRIPTION

Figure 1:
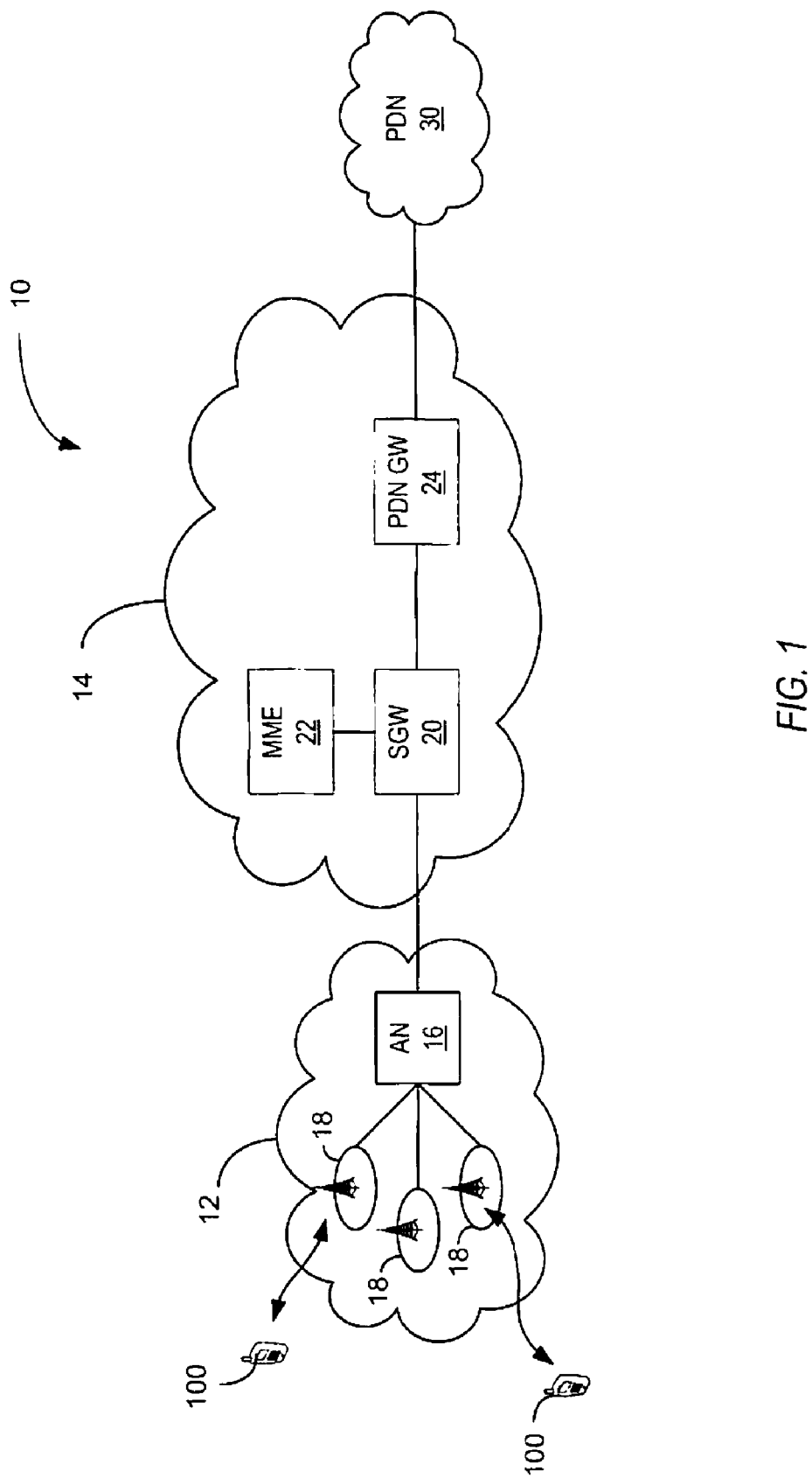
FIG. 1 shows an exemplary mobile communication network.

Referring now to the drawings, FIG. 1 illustrates an exemplary mobile communication network indicated generally by the numeral 10. The exemplary mobile communication network 10 is based on the Long-Term Evolution (LTE) architecture currently being developed by the 3$^{rd}$ Generation Partnership Project (3GPP). Those skilled in the art will appreciate, however, that the present invention is also applicable to other network standards, such as the Universal Mobile Telecommunications System (UMTS) Radio Access Network (UTRAN).

Mobile communication network 10 comprises a radio access network (RAN) 12 and a core network 14. RAN 12 comprises a single type of node referred to in the standard as an evolved node B (eNB). In this application, the eNB is referred to generically as an access node (AN) 16. AN 16 is a base station that communicates over the air interface with mobile terminals 100 (MT) 100. There are typically many ANs 16 in the RAN 12. Each AN 16 serves one or more cells 18. The cells 18 served by the AN 16 may use a single antenna site or multiple antenna sites. The antennas sites contain the radio equipment for communicating with the mobile terminals 100. The control circuits for the AN 16 may be located at one of the antenna sites or may be remotely located from the antenna sites.

The main elements of the core network 14 include the serving gateway (SGW) 20, mobility management entity (MME) 22, and packet data network gateway (PDN GW) 24. The ANs 16 connect to an SGW 20. The SGW 20 routes and forwards user data packets and acts as a mobility anchor for the mobile terminal 100 during handovers. For an idle state mobile terminal 100, the SGW 20 terminates the downlink data path and triggers paging when data arrives for the mobile terminal 100. The MME 22 is the entity responsible for mobility management. The MME 22 tracks the location of the mobile terminal 100 and pages the mobile terminal 100 when data arrives for an idle mode mobile terminal 100. The PDN GW 24 provides connection to external packet data networks (PDNs) 30. A mobile terminal 100 may simultaneously connect with more than one PDN GW 24 to access multiple PDNs 30. The PDN GW 24 is responsible for policy enforcement and charging.

Figure 2:
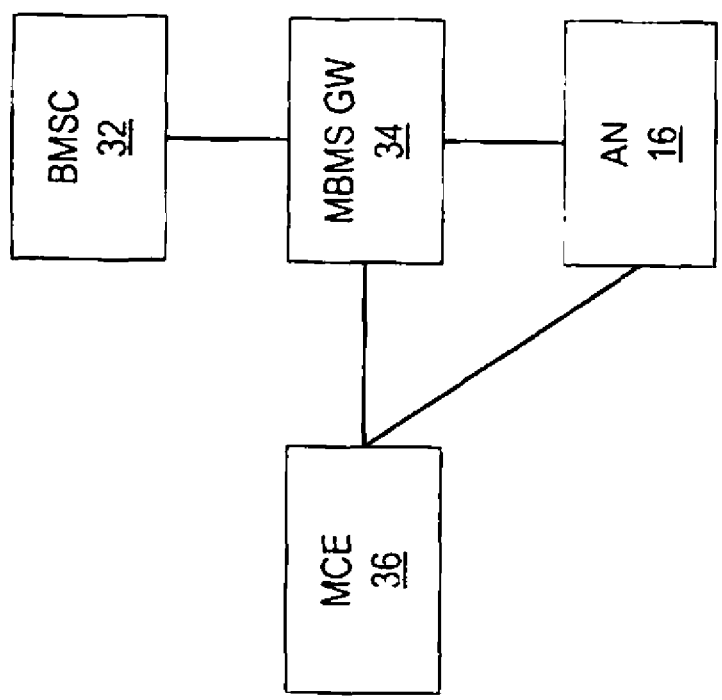
FIG. 2 shows logical entities for transmitting broadcast services.

The mobile communication network 10 supports Multimedia Broadcasts and Multicast Services (MBMS). MBMS enables multimedia content, such as television programs, movies, and other audio or video programs, to be transmitted to a mobile terminal 100 over the mobile communication network 10. FIG. 2 illustrates the logical entities involved in transmitting broadcast services to a mobile terminal 100. The multimedia content originates at a Broadcast Multicast Source (BMSC) 32. The BMSC 32 is responsible for scheduling and announcing broadcast services and is the data source for the broadcast service. The MBMS Gateway (MBMS GW) 34 is a logical entity in the core network 14 that forwards broadcast packets to each AN 16 transmitting the broadcast service. The MBMS GW 32 may use the IP multicast to forward the broadcast packets to the AN 16. The MCE 36 is a logical entity that allocates radio resources used by the AN 16 to transmit broadcast services. The MBMS Coordination Entity (MCE) 36 may also determine the modulation and coding schemes used for the broadcast service.

The transmission of broadcast services from the ANs 16 to the mobile terminal 100 may be by single cell transmission or MBSFN. In single cell transmission, the broadcast service is transmitted independently in each cell and there is no combining of transmissions from multiple cells by the mobile terminal 100. Scheduling is handled by the AN 16 responsible for the cell. MBSFN is characterized by coordinated transmission of the broadcast service from multiple transmitters within a common service area. A broadcast service area may comprise a mixture of MBSFN service areas and single cell service areas.

Figure 3:
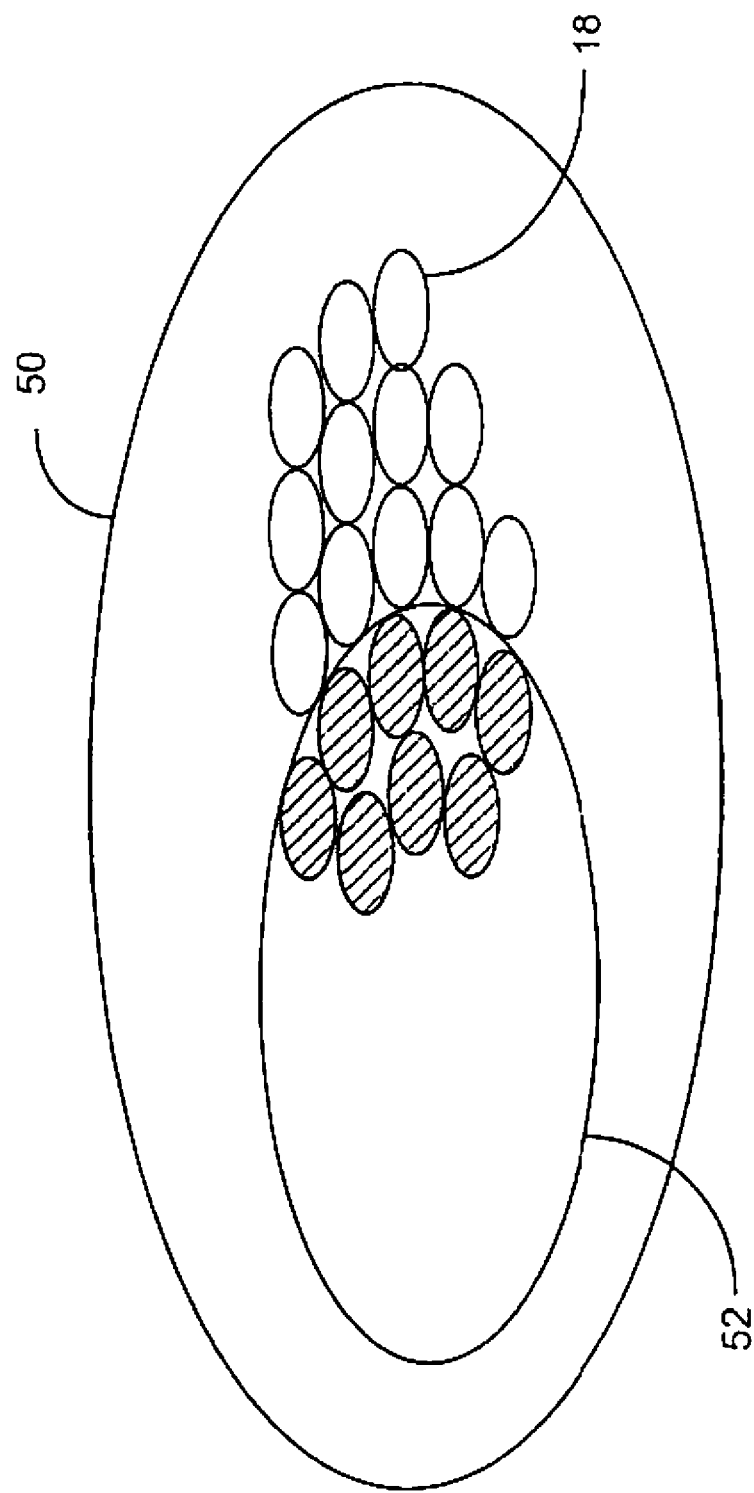
FIG. 3 shows an exemplary broadcast service area.

FIG. 3 illustrates a broadcast service area 50 comprising an MBSFN service area 52 and a plurality of individual cells 18 outside the MBSFN service area 52. The MBSFN service area 52 comprises multiple cells 18 shown with diagonal fill whose transmissions are coordinated by the MCE 36. Outside the MBSFN service area 52, each individual cell 18 provides only single cell transmission of the broadcast service. Typically, a control channel for MBMS, referred to as the MBMS control channel (MCCH), carries information that indicates, among other things, whether the cell 18 is part of the MBSFN and whether the MBMS is transmitted as a single-cell transmission. The MCCH may also be used to advertise broadcast services that are available in the cell 18.

When the mobile terminal 100 is within the MBSFN service area 52, each of the cells 18 in the MBSFN service area 52 transmits the same service synchronously using the same radio resources. Because the same broadcast service is being transmitted in the cells in the MBSFN service area 52, mobility is not an issue. The mobile terminal 100 does not need to take any action to maintain service as long as it remains within the MBSFN service area 52. However, as the mobile terminal 100 moves beyond the boundary of the MBSFN service area 52, the mobile terminal 100 will need to take action in order to maintain service continuity. For example, the mobile terminal 100 may establish a single cell transmission of the broadcast service in a specified target cell 18 outside of the MBSFN service area 52 as the mobile terminal 100 moves from the MBSFN service area 52 toward the target cell. However, the mobile terminal 100 may not have any knowledge of the boundaries of the MBSFN service area 52.

According to exemplary embodiments of the present invention, a mobile terminal 100 is notified when the mobile terminal 100 is approaching a boundary of an MBSFN service area 52. The notification may be explicit or implicit. Upon receipt of such notification, the mobile terminal 100 may take action to maintain continuity of the broadcast service. In one exemplary embodiment, the mobile terminal 100 may immediately establish a single cell transmission of the broadcast service by a target cell, which may be received by the mobile terminal 100 in parallel with the MBSFN transmission in the MBSFN service area 52. In other embodiments, the mobile terminal 100 may initiate quality measurements of the received signal in the MBSFN and trigger a single cell transmission only when the quality measurements indicate a need to do so. This approach would be more efficient from a resource utilization standpoint.

Figure 4:
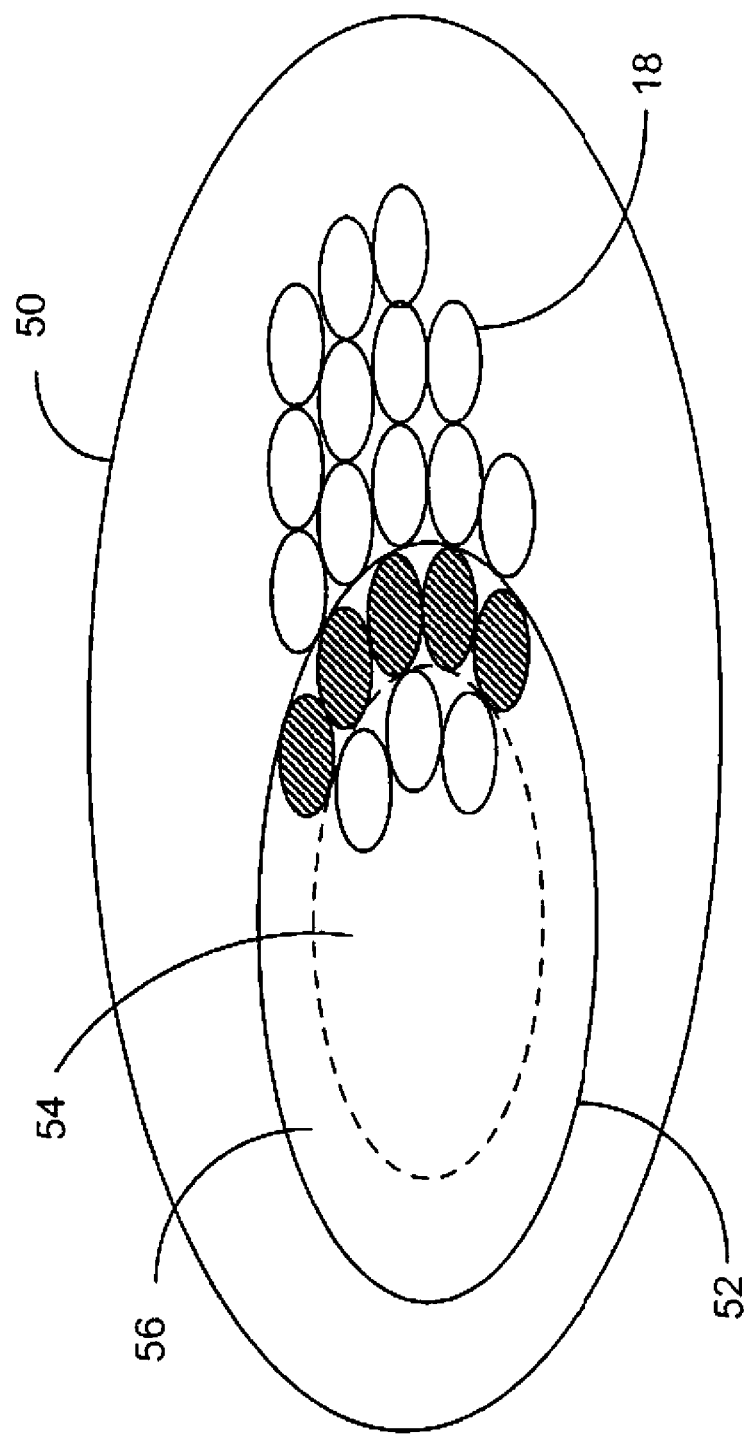
FIG. 4 shows an exemplary service area that provides service continuity.

FIG. 4 illustrates one exemplary method of providing notification to mobile terminal 100 when the mobile terminal 100 approaches a boundary of the MBSFN service area 52. The broadcast service area 50 comprises an MBSFN service area 52 and a plurality of individual cells 18 outside the MBSFN service area 52. The MBSFN service area 52 is divided into an inner region 54 and a boundary region 56 as shown by the dotted line in FIG. 4. Cells 18 located in the inner region 54 are shown with diagonal fill. The broadcast service is transmitted to the mobile terminal 100 by transmitters (e.g., base stations) located in both the interior region 54 and boundary region 56 of the MBSFN service area 52. In one exemplary embodiment, a new broadcast information element, referred to herein as a boundary indicator, is introduced to allow the mobile terminal 100 to determine the region it is currently located in. The boundary indicator is an explicit indicator that is transmitted to indicate whether the transmitter is within a boundary region 56. In one embodiment, the boundary indicator may comprise a single bit that is set to a first value (e.g., "1") when the transmitter is located in a boundary region 56, and is set to a second value (e.g., "0") when the transmitter is located in an interior region 54. The mobile terminal 100 monitors the boundary indicator transmitted in the MBSFN service area 52 to determine whether the mobile terminal 100 is approaching the boundary of the MBSFN service area 52.

In other embodiments, an implicit notification can be provided to the mobile terminal 100 to indicate when it is in a border region. As discussed above, control information for the MBMS is broadcast to the mobile terminals 100 on the MCCH. In one embodiment, a mobile terminal could differentiate a boundary region 56 from an interior region 54 by the formatting or the type of information that is broadcast on the MCCH. For example, a transmitter in the interior region 54 in the MBSFN service area 52 could advertise the availability of MBMSFN transmission, while the transmitters in the boundary region 56 contribute to the MBSFN transmission without advertising the availability of the MBSFN transmission. When the mobile terminal 100 enters the boundary region 56, it may assume based on the lack of advertising that MBSFN transmission is no longer available and begin searching for a cell that offers the broadcast service as a single-cell transmission. However, the search for a single-cell transmission would not preclude the mobile terminal from continuing to receive the MBSFN transmission.

The mobile terminal 100 may operate in a "reception only" mode (e.g., RRC_IDLE state) when the mobile terminal 100 is receiving the broadcast service in the MBSFN service area 52, although it may be engaged in other concurrent communications. In the "reception only" mode, the mobile terminal 100 receives the broadcast service and may perform basic measurements on the signal quality from neighboring cells. Because no uplink is needed in the "reception only" mode, the mobile terminal 100 does not send the measurement reports to the network. As the mobile terminal 100 moves toward the boundary of the MBSFN service area 52, it will first enter the boundary region 56. The boundary indicators transmitted in the MBSFN service area notify the mobile terminal 100 when it has entered the boundary region 56 of the MBSFN service area 52. The mobile terminal 100 may then transition from a "reception only" state to an "active" state (e.g., RRC_Connected state) and take appropriate action to maintain service continuity.

Figure 5:
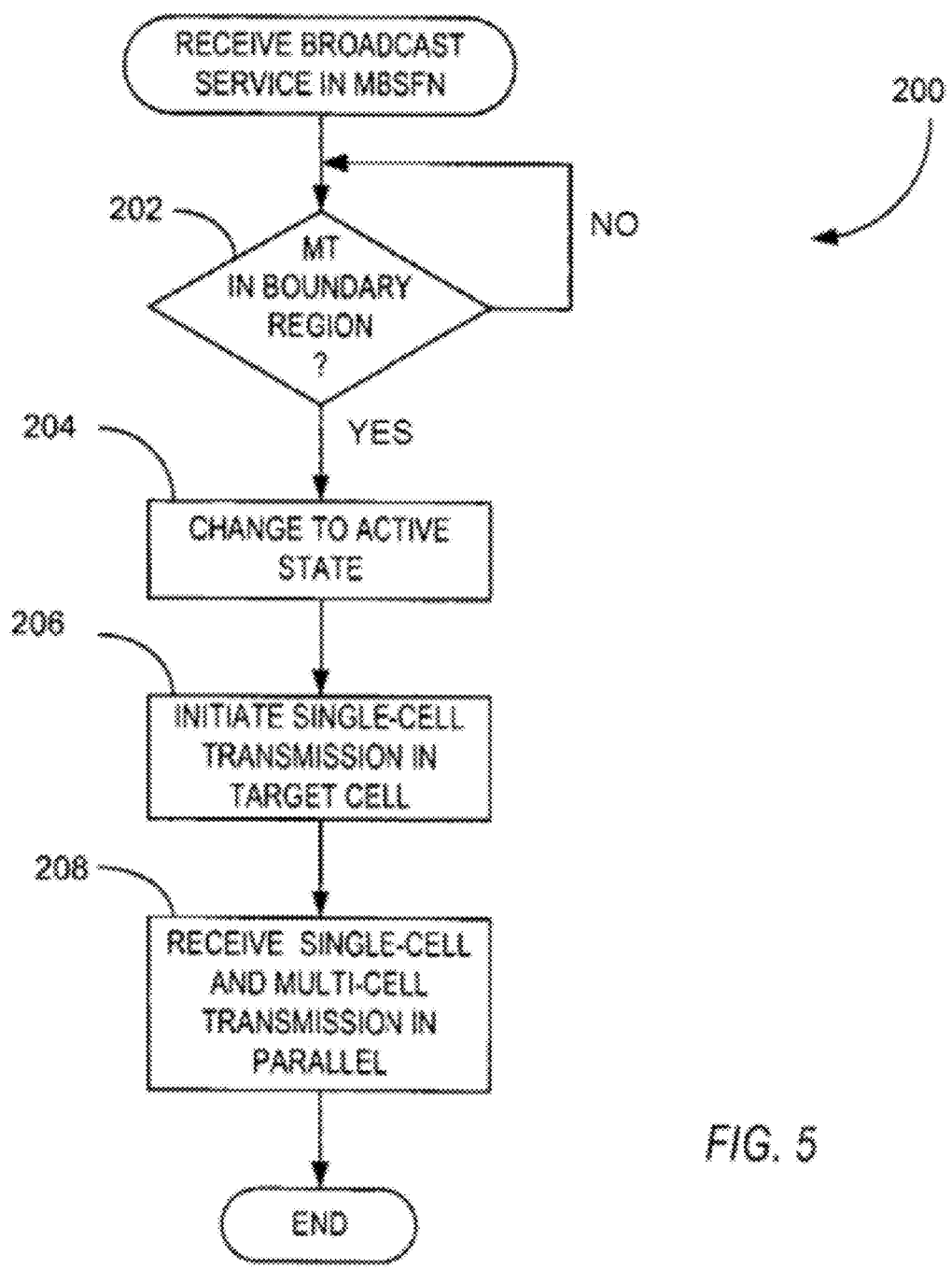
FIG. 5 shows an exemplary procedure for maintaining service continuity according to the present invention.

FIG. 5 illustrates an exemplary procedure 200 implemented by a mobile terminal 100 for maintaining service continuity after detection of the boundary indicator. The procedure shown in FIG. 5 begins with the mobile terminal 100 receiving the broadcast service. The mobile terminal 100 may be in a "reception only" state, but could also be engaged in other concurrent communications. The mobile terminal 100 monitors the transmission within the MBSFN service area 52 to detect the boundary indicator (block 202). When the boundary indicator is detected, the mobile terminal 100 transitions to an active state if it is not already in the active state (block 204). Once in the active state, the mobile terminal 100 may initiate a single cell transmission in a target cell 18 that borders the MBSFN service area 52 (block 206). The target cell 18 may be selected based on signal quality measurements made by the mobile terminal 100. The single cell transmission may be received in parallel with the MBSFN transmission in the MBSFN service area 52 (block 208). Thus, the mobile terminal 100 will not lose service as the mobile terminal 100 moves from the MBSFN service area 52 into the target cell 18.

Figure 6:
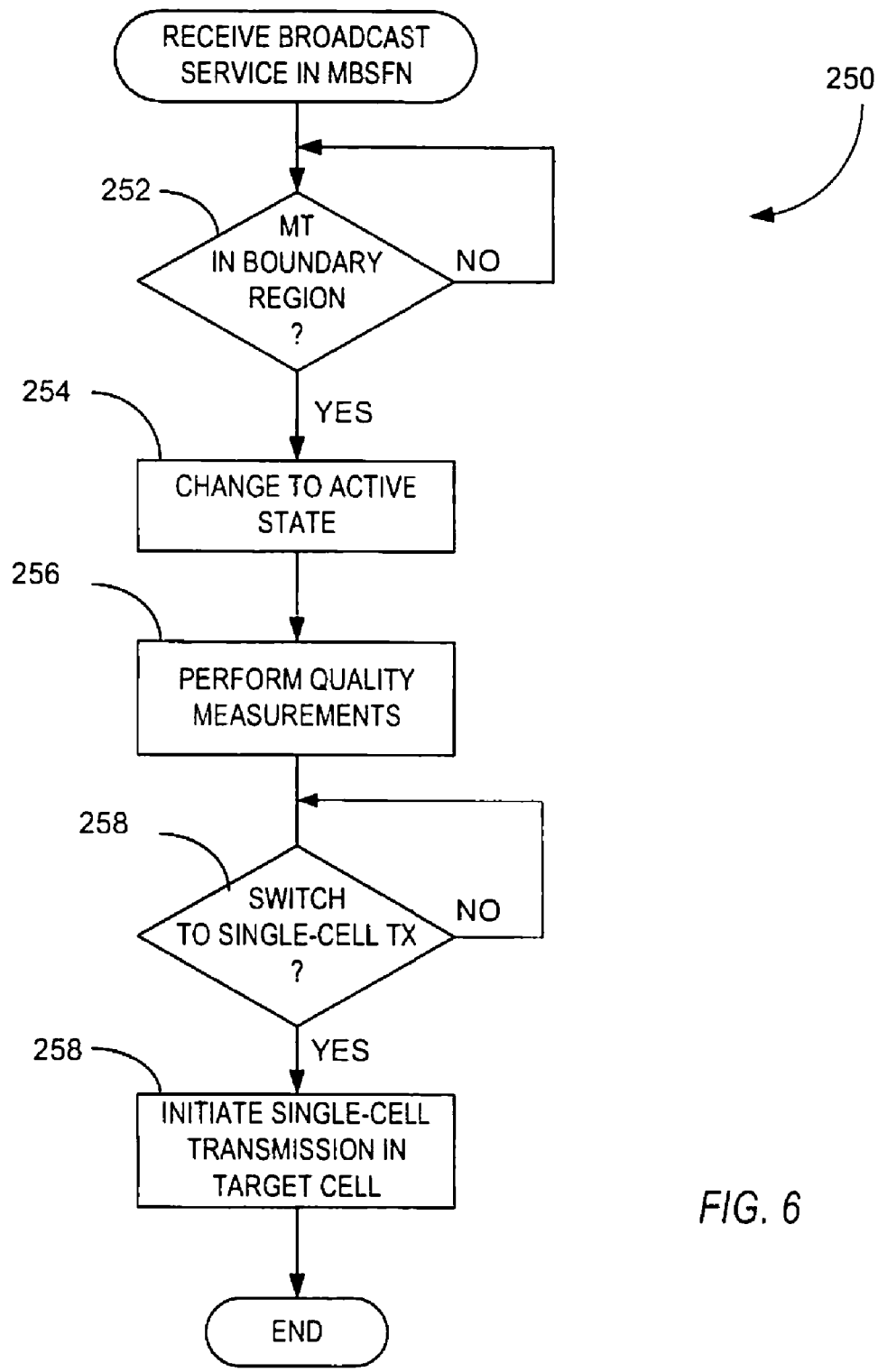
FIG. 6 shows another exemplary procedure for maintaining service continuity according to the present invention.

FIG. 6 illustrates an alternate procedure 250 that may be implemented by the mobile terminal 100 to maintain service continuity. The procedure begins with the mobile terminal 100 in a "reception only" mode. The mobile terminal 100 monitors the transmissions in the MBSFN service area 52 to determine whether it is within a boundary region 56 (block 252). When the mobile terminal 100 detects that it is within a boundary region 56, the mobile terminal 100 transitions to an active state if it is not already in the active state (block 254). In the active state, the mobile terminal 100 may perform quality measurements of the received signal in the MBSFN service area 52 (block 256). The mobile terminal 100 may then determine when to hand over to a single cell transmission based on the quality measurements (block 158). When the handover decision is made, the mobile terminal 100 may initiate single cell transmission in a selected target cell 18. Alternatively, the mobile terminal 100 may send measurement reports to the network and the handover decision may be made in the network. The network would then send a handover command to the mobile terminal 100 to initiate transition to a single cell transmission. One disadvantage of this approach is that signaling is required between the mobile terminal 100 and the network.

An implicit notification that the mobile terminal has left the MBSFN service area 52 may occur when the mobile terminal recognizes that the MBSFN transmission is neither transmitted nor announced in the cell 18. In this case, the mobile terminal 100 may initiate the MBMS service as a single cell transmission while still receiving the MBSFN transmission from MBSFN service area 52. This may cause the mobile terminal to transition from "reception only" to "active state" upon leaving area 56 and 52 and entering a single cell 18 outside the MBSFN service area 52.

Figure 7:
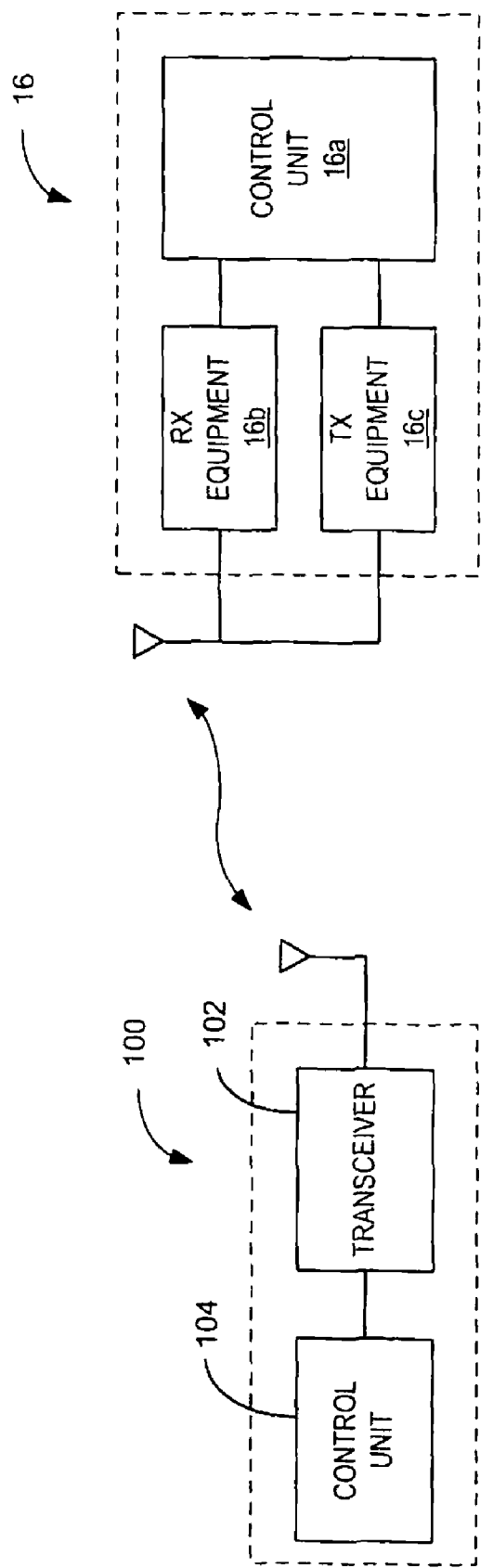
FIG. 7 shows an exemplary access node in communication with an exemplary mobile terminal.

FIG. 7 illustrates an exemplary access node 16 and mobile terminal 100. The access node 16 includes a control unit 16a and radio equipment 16b, 16c for communicating with mobile terminals 100. The radio equipment, which may be located at an antenna site, includes reception equipment 16b and transmission equipment 16c for communicating over the air interface with mobile terminals. The control unit 16a includes logic for performing the functions of the AN 16, such as radio resource control and scheduling. The mobile terminal 100 comprises a radio transceiver 102 for communicating over the air interface with the AN 16 and a control unit 104 to control the operation of the mobile terminal 100 as hereinabove described.

The present invention provides a method to maintain service continuity as the mobile terminal 100 moves from an MBSFN service area 52 into single cell transmission service area. By transmitting a boundary indicator in the boundary region 56 of the MBSFN service area 52, the interruption of broadcast service during handover for MBSFN to single cell transmission is prevented. In some embodiments, the transition from MBSFN to single cell transmission is made without the need for an uplink channel or mobile terminal 100 feedback.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method implemented by a mobile terminal in a mobile communication network for maintaining service continuity for a broadcast service as the mobile terminal moves from a single frequency network service area to a single cell service area, said method comprising:
   receiving a boundary indication at the mobile terminal transmitted by an access node in a boundary region of said single frequency network service area indicating that the mobile terminal has entered said boundary region;
   performing a predetermined service continuity action in response to receipt of said boundary indication to maintain service continuity for said broadcast service in the event that the mobile terminal leaves said single frequency network service area, wherein said predetermined service continuity action comprises initiating a single-cell transmission for said broadcast service in a target cell, wherein said target cell is outside of said single frequency network service area; and
   receiving at the mobile terminal both said single-cell transmission concurrently with a single frequency network transmission in said single frequency network service area.

2. The method of claim 1 wherein performing said predetermined service continuity action comprises initiating quality measurements of said single frequency network transmission in said single frequency network service area.

3. The method of claim 2 further comprising initiating said single-cell transmission for said broadcast service based on said quality measurements.

4. The method of claim 1 wherein performing said predetermined service continuity action comprises sending a notification to said access node.

5. The method of claim 1 wherein receiving the boundary indication comprises receiving an explicit boundary indicator broadcast by said access node over a broadcast control channel.

6. The method of claim 1 wherein receiving the boundary indication comprises receiving an implicit boundary indication from said access node.

7. A mobile terminal in a mobile communication network configured to receive a broadcast service within a single frequency network service area, said mobile terminal comprising:
- a transceiver to receive a boundary indicator from an access node in a boundary region of said single frequency network service area indicating that the mobile terminal has entered said boundary region; and
- a control circuit configured to perform a predetermined service continuity action in response to receipt of said boundary indication to maintain service continuity for said broadcast service in the event that the mobile terminal leaves said single frequency network service area, wherein said predetermined service continuity action comprises initiating a single-cell transmission for said broadcast service in a target cell, wherein the target cell is outside of said single frequency network service area, and further wherein said control circuit further configures said transceiver to receive both said single-cell transmission concurrently with a single frequency network transmission in said single frequency network service area.

8. The mobile terminal of claim 7 wherein said predetermined service continuity action comprises initiating signal quality measurements of said single frequency network transmission in said single frequency network service area.

9. The mobile terminal of claim 8 wherein said control circuit is further configured to initiate said single-cell transmission for said broadcast service based on said signal quality measurements.

10. The mobile terminal of claim 9 wherein said predetermined service continuity action comprises sending a notification to said access node.

11. The mobile terminal of claim 10 wherein the boundary indication received by said transceiver comprises a boundary indicator broadcast by said access node over a broadcast control channel.

12. The mobile terminal of claim 10 wherein the boundary indication received by said transceiver comprises an implicit boundary indication.

* * * * *

UNITED STATES PATENT AND TRADEMARK OFFICE
CERTIFICATE OF CORRECTION

PATENT NO. : 8,345,638 B2
APPLICATION NO. : 12/602409
DATED : January 1, 2013
INVENTOR(S) : Buchmayer et al.

It is certified that error appears in the above-identified patent and that said Letters Patent is hereby corrected as shown below:

In Column 2, Line 12, delete "boarder cells" and insert -- border cells --, therefor.

In Column 4, Line 53, delete "MBMSFN" and insert -- MBSFN --, therefor.

In Column 5, Line 48, delete "(block 158)." and insert -- (block 258). --, therefor.

Signed and Sealed this
Second Day of April, 2013

Teresa Stanek Rea
*Acting Director of the United States Patent and Trademark Office*